June 19, 1934.    R. D. EVANS    1,963,193
PROTECTIVE RELAY
Filed March 17, 1930

INVENTOR
Robert D. Evans.
BY
Wesley G. Carr
ATTORNEY

Patented June 19, 1934

1,963,193

UNITED STATES PATENT OFFICE 1,963,193

PROTECTIVE RELAY

Robert D. Evans, Swissvale, Pa., assignor to Westinghouse Electric & Manufacturing Company, a corporation of Pennsylvania Application March 17, 1930, Serial No. 436,404

11 Claims. (Cl. 175—294)

My invention relates to a simplified relay means for the protection of polyphase transmission systems and is especially applicable to solidly grounded neutral systems wherein load currents are small, in comparison with short-circuit currents.

Relays and meters energized in accordance with the phase-sequence components of voltage and current are well known, the fundamental principles relating thereto being disclosed in Patent No. 1,535,593 issued to Westinghouse Electric and Manufacturing Company upon an application filed by Charles LeG. Fortescue et al.

In Patents Nos. 1,535,587 and 1,535,588, I first disclosed a static network means for segregating different phase-sequence components from a ployphase system. Briefly, such static network comprises two electrically connected impedances of equal absolute values, the voltage and current thereof bearing a predetermined phase relation which is dependent upon the number of phases in the system and the phase-sequence component of an electrical quantity to be segregated therefrom.

Assuming such static network for a three-phase system, the current in one impedance branch is made to lag 60° with respect to the voltage impressed thereon, while the current and voltage in the other impedance branch are in phase. The static network is electrically connected to the three-phase system through voltage or current transformers, the choice of transformers depending upon the phase-sequence components of the electrical quantity to be segregated from the system.

A relay or meter connected across, or in parallel with, the static network may be energized by either the positive or the negative phase-sequence components of voltage or current. An unbalanced three-phase system may be resolved into positive, negative and zero phase-sequence components, the different elements of the respective components being spaced 120° apart. The zero phase-sequence components, however, are not angularly displaced but are of equal magnitude and in phase and occur only in grounded-neutral systems.

Thus, either the positive or the negative phase-sequence components of an electrical quantity may be segregated from a polyphase system and thereafter applied to metering or relay systems by means of a network, as referred to above.

In any three-phase system, such as a three-phase transmission system, there are three things which a protective-relay means should accomplish, namely: protection against three-phase short circuits, single and double phase faults-to-ground and phase-to-phase short-circuits. On the occurrence of a three-phase short-circuit, only the positive phase-sequence components of voltage and current are in existence, this condition being similar to that for sustained load conditions. For a single or double phase-to-ground fault, the positive, negative and zero-phase-sequence components result, the magnitude of each depending on the location of the fault and the constants of the system. In the event of a phase-to-phase short-circuit, the positive and the negative phase-sequence components are present the zero phase-sequence component being zero.

It is obvious, therefore, that, for the full protection of a three-phase transmission system, it has been necessary to provide at least two relays responsive, respectively, to the positive and the negative phase-sequence components of an electrical quantity. As noted above, the positive phase-sequence components are present for any kind of fault, but there is only an increase in magnitude thereof for sustained load conditions or a three-phase short-circuit. For faults other than three-phase short-circuits, the negative phase-sequence components combine vectorially with the positive phase-sequence components to produce the total fault current, unless the system is a grounded-neutral system. In the latter case, the zero-sequence components would also be present.

The necessity for two relays is at once apparent when it is realized that, on some system, a single relay responsive to positive phase-sequence components would have to be actuated for a lower value of positive phase-sequence voltage or current than is present under normally balanced-system conditions. False operation of such relay would necessarily result, for unbalanced load conditions, and, to correct this condition, a relay responsive to positive phase-sequence components for three-phase short-circuits or sustained load conditions, and a second relay responsive to negative phase-sequence components for other fault conditions, have been provided.

Static networks, similar to those which I first proposed, have been utilized extensively for segregating the positive or the negative phase-sequence components from a polyphase system, the respective networks being the same for the segregation of both sequences. To obtain either the positive or the negative phase-sequence components from the system and use the same network in either case, it is necessary only to reverse the transformer connections to the network terminals. Separate networks have also been required for segregating the phase-sequence components for the respective relays, and, in many instances, the networks have been included in the construction of the respective relays.

It is an object of my invention, therefore, to provide a single protective relay responsive to both the positive and the negative phase-sequence components of an electrical quantity in a polyphase transmission system.

Another object of my invention is to provide a static network associated with a polyphase transmission system which segregates both the positive and the negative phase-sequence components of an electrical quantity from the system.

Another object of my invention is to minimize the number of relays necessary for providing full protection for any polyphase system.

A further object of my invention is to control the phase-sequence components of an electrical quantity in a protective relay, this control being coordinated with the characteristics of the system to be protected, so that the desired relay performance is obtained.

A further object of my invention is to provide a single relay that shall be responsive to any system fault and free from all zero phase-sequence components.

Further objects of my invention will become apparent from the following description of the operation thereof.

In order to explain the operation of my invention, it will be considered in comparison with the operation of single-phase relays. In order to provide simple over-current protection, a single-phase relay must be associated with each phase of a polyphase system. Any one of the single-phase relays is actuated when the value of current in its associated phase attains a predetermined magnitude, irrespective of the current in the remaining phases of the system.

It may be readily seen, therefore, that, with single-phase relays associated with a three-phase system, it is not possible to make the relays more sensitive for line-to-line faults than for the normal three-phase load currents. Since it is obviously desirable to obtain a lower equivalent setting for line-to-line faults than for normal balanced loads, the application of the single-phase relay becomes limited. The necessity for a relay in each phase is also apparent in order that protection may be provided for faults-to-ground.

The introduction of phase-sequence relays has overcome the limitations of the single-phase relay, and lower settings for the relays are made possible. Negative phase-sequence relays are provided for line-to-line or line-to-ground faults; zero phase-sequence relays may also be used for line-to-ground faults; and positive phase-sequence relays of appropriate setting are provided for three-phase short-circuits.

On any particular system, the value of the phase-sequence components of voltage or current that would occur for different kinds of faults may be computed mathematically in a manner well known in the art. It is clear, therefore, that the different phase-sequence relays may be adjusted in any system to provide a very effective coordinated performance and better protection for the system than if the ordinary single-phase line-current relays are provided.

In all of the networks heretofore proposed, there was no conception of relating the constants of the network in accordance with the characteristics of a particular system. With available methods of calculation, the magnitude and phase relation of the various phase-sequence components may be determined for the various fault conditions occurring on any particular system. The relations in the network may also be determined whereby the associated relay may be caused to function in the manner desired. In other words, I propose to adjust the constants of the network in accordance with the impedance characteristics of the system.

For a better understanding of my invention, wherein one relay is made to provide full protection for any kind of fault occurring on a polyphase system, reference will be made to the various figures in the accompanying drawing.

Figure 1:
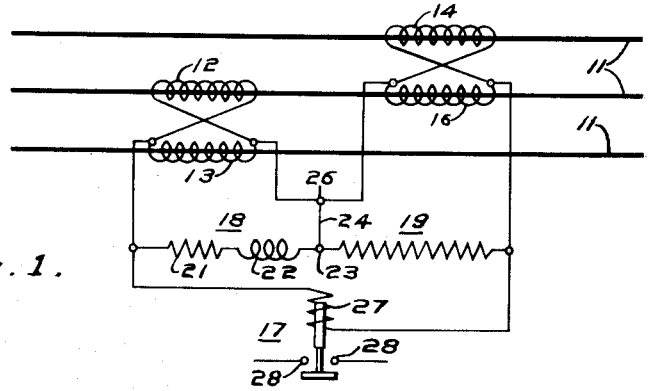
Figure 1 is a diagrammatic representation of my invention as applied to a polyphase system.

In Fig. 1, I have shown a simple form of my invention wherein only the phase-sequence components of current are considered. Current transformers 12, 13, 14 and 16 are electrically associated with the phases of a three-phase system 11. The pairs of current transformers 12, 13 and 14, 16 have their respective secondary windings cross-connected, thereby providing a circulating path for the zero phase-sequence components of current and preventing the flow of the zero phase-sequence current through an associated protective-relay means.

The pairs of current transformers 12, 13 and 14, 16 are connected in series with the winding 27 of a relay 17. Impedance devices 18 and 19 are connected in series across the relay 17, and the point 23 therebetween is connected, by a conductor 24, to the point 26 between the windings of the series-connected pairs of current transformers. The relay 17 is adapted to close its contacts 28 when the coil 27 is energized, thereby providing a means for closing or energizing any desired protective circuit (not shown).

The impedance devices 18 and 19 have equal absolute values but the impedance 18 comprises a non-inductive resistance 21 and an inductance 22 while the impedance 19 comprises a substantially non-inductive resistance.

The network comprising the two impedances 18 and 19 appears to be similar to those employed heretofore for segregating either the positive or the negative phase-sequence components of voltage and current from a polyphase system. However, in the networks proposed by the prior art, the phase-angle between the current and the voltage in one branch has been 60° leading or 60° lagging. In my present invention, I propose to deliberately vary this phase-angle from that of 60°, to 55°, 50°, 45°, or some other phase-angle different from the usual phase displacement of 60°.

To obtain the desired phase relation, the values of the inductance 22 and the resistance 21 are so varied that the voltage will lead the current flowing in the impedance 18 by an angle other than 60°. Assuming that the network, comprising the impedances 18 and 19, is a true negative phase-sequence network, the current in the inductance 22 lags behind the impressed voltage by an angle of 60°. Assuming, however, that the phase angle is changed to 55°, in accordance with the present invention, the network now segregates a small amount of positive phase-sequence components of current in addition to the negative phase-sequence components of current. The energizing winding 27 of the relay 17 is, therefore, energized in accordance with both the positive and the negative phase-sequence components of current occurring in the system 11.

Because of the many advantages resulting from the application of phase-sequence relays for the protection of polyphase systems, it is highly desirable to retain those advantages while reducing the number of relays. My invention fulfils the requirements mentioned above and utilizes only one relay.

The function and degree of energization, for the different system conditions, of the relay utilized in my invention will be apparent from an examination of the following tables.

Table No. 1

| Angle | $I_P$ | $I_N$ | $I_{L-L}$ | $I_{L-N}$ | $I_{L+L-N}$ |
|---|---|---|---|---|---|
| 60° | .000 | 1.00 | .577-.577 | .577-.715 | .500-.500 |
| 55° | .050 | .98 | .577-.617 | .530-.756 | .463-.540 |
| 50° | .100 | .95 | .577-.664 | .490-.802 | .432-.571 |
| 45° | .150 | .92 | .577-.704 | .445-.848 | .405-.610 |

Table No. 2

| Angle | $3\phi\ I_P$ | $I_N$ | $1\phi$ L-L | $1\phi$ L-N | $2\phi$ L-N |
|---|---|---|---|---|---|
| 55° | 5.00 | .26 | .43-.41 | .47-.43 | .54-.47 |
| 55° | 4.00 | .20 | .35-.32 | .38-.27 | .43-.38 |
| 55° | 3.00 | .15 | .23-.24 | .28-.20 | .32-.28 |
| 55° | 2.00 | .10 | .17-.16 | .19-.13 | .21-.19 |
| 50° | 5.00 | .52 | .87-.75 | 1.02-.62 | 1.16-.87 |
| 50° | 4.00 | .42 | .69-.60 | .82-.50 | .93-.70 |
| 50° | 3.00 | .32 | .52-.45 | .61-.38 | .70-.52 |
| 50° | 2.00 | .21 | .34-.30 | .41-.25 | .46-.35 |
| 45° | 5.00 | .81 | 1.30-1.06 | 1.69-.89 | 1.85-1.23 |
| 45° | 4.00 | .65 | 1.04-.85 | 1.35-.71 | 1.48-.98 |
| 45° | 3.00 | .49 | .78-.64 | 1.02-.53 | 1.08-.74 |
| 45° | 2.00 | .32 | .52-.43 | .67-.35 | .74-.49 |

By the terms "relay response" or "response", as used in connection with these tables and in the appended claims, is meant the degree of energization of a relay expressed in any convenient variable such as relay current, produced by a unit line condition such as a unit fault current or a unit positive or negative sequence current.

Table No. 1 gives the response of a relay, as required by my invention, to the various combinations of line currents, which, in each case, are taken as being of unity magnitude. In this table, "Angle" represents the phase-angle between the voltage and the current in branch 18 of the network shown in Fig. 1. Under the heading $I_P$ is given the response of the relay to normal positive phase-sequence balanced currents. Under the heading $I_N$ is given the response of the relay to normal negative phase-sequence or reverse-phase symmetrical currents. Under the heading $I_{L-L}$ is given the response of the relay for line-to-line short-circuit current. Under the heading $I_{L-N}$ is given the response of the relay for line-to-neutral or line-to-ground faults. Under the heading $I_{L+L-N}$ is given the response of the relay to the currents flowing, in the case of a double fault between conductors and neutral or ground.

In the above table, it will be noted that two sets of values are given under each of the three unsymmetrical conditions considered. These values cover the range of currents which depend upon the relative location of the fault and the connection of the current transformers supplying the protective relay. The mathematical calculations for obtaining the values given in the two tables, is based upon the relation $Z=e^{j\theta}R$ where Z is the impedance of the branch 18, R is the impedance of the branch 19, and $\theta$ is the phase-angle (45° to 60°, approximately). The values of current for a double line-to-neutral or ground fault are based on the assumption that the impedances to the flow of positive, negative and zero phase-sequence components are equal.

The method of adjusting the relay setting to meet the requirements of a particular system may be more readily understood by referring to Table No. 2. In this table, the relative value of line currents for the various fault conditions considered in Table No. 1 are given. The values given in Table No. 2 are derived from the values given in Table No. 1 by dividing the latter values into unity. The second or each subsequent line under each heading, corresponding to the angle of the impedance, is obtained by changing the relay setting in direct proportion. The same result could also be obtained by the use of current transformers of correspondingly higher ratios.

According to Table No. 2, it will be noticed that the relay is relatively insensitive to positive phase-sequence or normal three-phase currents. On the other hand, the relay is very sensitive to faults of any kind whether line-to-line, line-to-ground, double fault-to-ground or reverse phase.

In applying the relay to a particular system, it is necessary to consider the relative values of the fault currents for negative and zero phase-sequence, in comparison with the positive phase-sequence current, which may be obtained in the event of a three-phase fault. The relative values will determine the phase-angle of the impedance 18 (Fig. 1). The current transformers are then chosen to obtain the proper setting of the relay in terms of the normal current.

Figure 2:
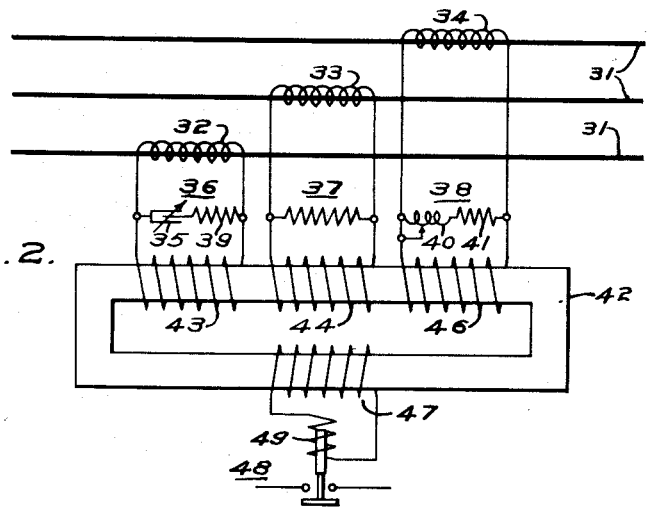
Fig. 2 is a diagram of a modification of my invention showing alternative network and transformer connections.

In Fig. 2, current transformers 32, 33 and 34 are electrically associated with the respective phases of a three-phase system 31, the respective secondary windings of the current transformers being connected in series with windings 43, 44, and 46, respectively. The windings 43, 44 and 46 are disposed on a core 42, thereby allowing the fluxes of the core windings to interlink. A winding 47 is also associated with the core 42 and is connected in series with the energizing winding 49 of a relay 48.

An impedance device 36 is connected in parallel across the winding 43 and the secondary winding of the current transformer 32. The impedance device 36 comprises a variable capacitance 35 and a non-inductive resistance 39.

An impedance device 37, which comprises a substantially non-inductive resistance, is connected in parallel across the winding 44 and the secondary winding of the current transformer 33.

An impedance device 38, comprising a variable inductance 40 and a non-inductive resistance 41, is connected in parallel with the winding 46 and the secondary winding of the current transformer 34.

Windings 43, 44 and 46, and the impedance devices 36, 37 and 38 may be adjusted to make the current in the windings 43, 44 and 46 in phase, leading or lagging the current in the current transformers 32, 33 and 34, respectively. If the power-factors of the impedance of the coils 43, 44 and 46 are identical with the impedance of the branches 36, 37 and 38, respectively, the current in the windings 43, 44, and 46 will be in phase with the currents in the secondary windings of the current transformers 32, 33 and 35, respectively.

In this case, the interlinking of the fluxes of the windings 43, 44 and 46 will produce a resultant flux in the core 42, thereby causing a flux to be induced in the winding 47. With impedances 36, 37 and 38 of the same power-factor, the winding 49 of the relay 48 would be energized only in accordance with the zero phase-sequence components of current and would not be energized in accordance with the positive and negative phase-sequence components of current.

By varying the value of the capacitance 35 of the impedance device 36, the power-factor of the impedance device 36 is made lower than the power-factor of the winding 43. By varying the value of the inductance 40 of the impedance device 38, the power factor of the impedance device 38 is made higher than the power-factor of the winding 46. With such an arrangement, it is possible to obtain leading current in the winding 43, in-phase current in the winding 44 and lagging current in the winding 46. By providing such phase shift, the winding 49 of the relay 48 will be responsive to positive and negative phase-sequence components of current.

By varying the amount of phase shift, which may be accomplished in the manner explained above, it is possible to make the relay 48 more responsive to negative phase-sequence components of current than to the positive phase-sequence components of current, without greatly reducing the response of the relay 48 to zero phase-sequence components of current.

In any particular case, the values of positive, negative and zero phase-sequence components of current, resulting from different kinds of faults, must be considered in order to provide the proper adjustment of the impedance devices 36, 37 and 38.

By providing that the phase-shift shall lead and lag by an angle such as 10°, it is obvious that the relay 48 will respond to three-phase short-circuits as well as to other faults. The theory of the operation is essentially the same as that outlined in greater detail with reference to Fig. 1.

Figure 3:
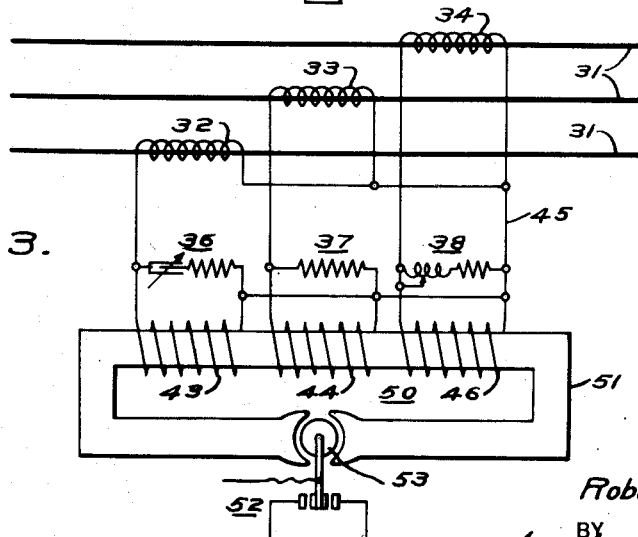
Fig. 3 is a diagram of a still further modification in which different transformer connections are utilized.

Fig. 3 is a modification of the arrangement shown in Fig. 2. Current transformers 32, 33 and 34 are electrically associated with the three-phase system 31, the secondary windings of the transformers being star-connected. The common terminal of the star-connected current transformers is connected, through a conductor 45, to one terminal of each of the windings 43, 44 and 46. The other terminals of the windings 43, 44 and 46 are respectively connected to the other secondary terminals of the current transformers 32, 33 and 34.

The windings 43, 44 and 46 are inductively associated with a core 51 of an electro-responsive device 50 comprising the said core member and a relay 52 having a rotatable armature 53. Impedance devices 36, 37 and 38, similar to those shown in Fig. 2, are connected in parallel across the respective windings 42, 43 and 44.

In this modification of my invention, the armature 53 of the relay 52, is actuated in accordance with the phase-sequence components of current segregated from the system 31. The zero phase-sequence components of current will actuate the relay in the event of ground faults on the three-phase system 31, and, for other faults, the relay 52 will be actuated in accordance with the positive and negative phase-sequence components of current, depending on the degree of phase shift provided by the impedance devices 36, 37 and 38.

The relays shown in the various modifications of my invention are provided with contacts whereby any suitable control or protective circuit may be effected, such auxiliary circuits not being shown.

I have shown only means for segregating the phase-sequence components of current from a polyphase system but it is to be understood that my invention is equally applicable to the segregation of the phase-sequence components of voltage. The description has further been limited to a three-phase grounded-neutral system but my invention may also be applied to any polyphase system, grounded or ungrounded.

I have shown the combination of an inductance and resistance, and a capacitance and resistance, for providing a leading and a lagging phase-angle, respectively, and other combinations effecting the same result are believed to be within the scope of the present invention.

I realize that various changes and modifications of my invention may be made by one skilled in the art and, therefore, no limitations should be placed thereon except such as are imposed by the prior art and are set forth in the appended claims.

I claim as my invention:

1. In a protective system for a polyphase circuit, a network associated therewith, and a relay having a single energizing means energized from said network in accordance with the positive and negative phase-sequence components of an electrical quantity of said circuit.

2. The combination, in a polyphase transmission system, of transforming means electrically associated therewith, and a single impedance network electrically associated with said transforming means for effecting the segregation of a resultant of more than one phase-sequence component of a polyphase electrical quantity occurring in said system, the proportions of said components segregated from the transmission system being determined in accordance with the phase-sequence impedance characteristics of said system.

3. In a polyphase transmission system, the combination with an impedance means for segregating the positive and negative phase-sequence components of an electrical quantity from said system in accordance with the impedance characteristics of said system, of a relay having a single energizing means energized in accordance with said phase-sequence components.

4. In a polyphase system, the combination with a relay having an energizing winding, of means for energizing said relay winding in accordance with a resultant of more than one phase-sequence component of an electrical quantity occurring in said system.

5. The combination with an unbalanced polyphase circuit, of an electro-responsive means having a single energizing winding, and a network means connected between the circuit and said electro-responsive means, said electro-responsive means adapted to be energized in accordance with more than one symmetrical component of a polyphase electrical quantity.

6. The combination with a three-phase circuit and an electro-responsive device having a single energizing winding, of transforming means electrically associated with said circuit, an impedance network electrically associated between said transforming means, and said electro-responsive device for energizing said electro-responsive device in accordance with more than one symmetrical component of a polyphase electrical quantity.

7. In a protective system for a polyphase system, an impedance network electrically associated with said polyphase system, the constants of said network providing for the segregation of a resulant of predetermined amounts of positive and negative phase-sequence components of an electrical quantity in said polyphase system, the proportions of said phase-sequence components being determined in accordance with the phase-sequence impedance characteristics of said system, and a relay energized from said network to provide protective action for various types of faults.

8. In an alternating-current system, a three-phase circuit, a plurality of impedance elements, means for energizing said impedance elements in accordance with a plurality of phases of a three-phase electrical condition derived from said circuit, and relay means responsive to a resultant condition of energization of said impedance elements, said impedance elements having a predetermined relationship of absolute impedance values and impedance phase angles, determined from the constants of said circuit, such that said relay means responds to symmetrical and unsymmetrical conditions of said circuit, and the response of said relay means to a unit electrical condition of said circuit is greater for an unbalanced condition produced by an unsymmetrical fault than for a balanced condition.

9. In an alternating-current system, a three-phase circuit, a plurality of impedance elements, means for energizing said impedance elements in accordance with a plurality of phases of a three-phase current condition derived from said circuit, and relay means responsive to a resultant condition of energization of said impedance elements, said impedance elements having a predetermined relationship of absolute impedance values and impedance phase angles, determined from the constants of said circuit, such that said relay means responds to symmetrical and unsymmetrical conditions of said circuit and the response of said relay means to a unit current condition of said circuit is greater for an unbalanced condition produced by an unsymmetrical fault than for a balanced current condition.

10. In an alternating-current grounded-neutral system, a three-phase circuit, a plurality of impedance elements, means for energizing said impedance elements in accordance with a plurality of phases of a three-phase current system, free from zero sequence current, derived from said circuit and relay means responsive to a resultant condition of energization of said impedance elements, said impedance elements having a predetermined relationship of absolute magnitudes and impedance phase angles, determined from the constants of said circuit, such that said relay means responds to symmetrical and unsymmetrical conditions of said circuit, and the response of said relay means to unsymmetrical current conditions of said circuit is substantially uniform for phase-to-phase, phase-to-ground and double-phase-to-ground faults of zero fault impedance for any permutation of phases, and is less for balanced current conditions of said circuit.

11. In an alternating current system, a three phase circuit, an impedance network having impedance means included in a first network branch and impedance means included in a second network branch, the constants of said impedance means being so related that the absolute impedance of said first branch is substantially equal to the absolute impedance of said second branch and the difference of the impedance phase angles of said first and second branches differs from 60° by an angle determined by the constants of said three-phase circuit, means for energizing said first branch in accordance with a phase quantity of a polyphase electrical condition of said three-phase circuit, means for energizing said second branch in accordance with a second phase quantity of said polyphase condition, and relay means responsive to a resultant condition of energization of both of said branches.

ROBERT D. EVANS.